(No Model.)

E. B. DURFEE.
RAIL SCRAPER AND SNOW PLOW.

No. 364,230. Patented June 7, 1887.

WITNESSES
INVENTOR
Elisha B. Durfee
By _____ Attorney

UNITED STATES PATENT OFFICE.

ELISHA B. DURFEE, OF LINCOLN, NEBRASKA.

RAIL-SCRAPER AND SNOW-PLOW.

SPECIFICATION forming part of Letters Patent No. 364,230, dated June 7, 1887.

Application filed January 24, 1887. Serial No. 225,235. (No model.)

*To all whom it may concern:*

Be it known that I, ELISHA B. DURFEE, a citizen of the United States of America, residing at Lincoln, in the county of Lancaster, in the State of Nebraska, have invented a new and useful Rail-Scraper and Snow-Plow, of which the following is a specification.

My invention has relation to improvements in rail-scrapers and snow-plows for use on railways and tramways; and the objects are, first, to provide a device of the kind named which will clear the rails from snow, slush, and other obstructions accumulated thereon at a less expenditure of power than is required by the devices or machines heretofore known and in use, and, second, to provide a life-guard that shall be constant and effectual in preventing the wheels of a car from running onto or over any living being. These objects I attain by the mechanism illustrated in the accompanying drawings, wherein—

Figure 1:
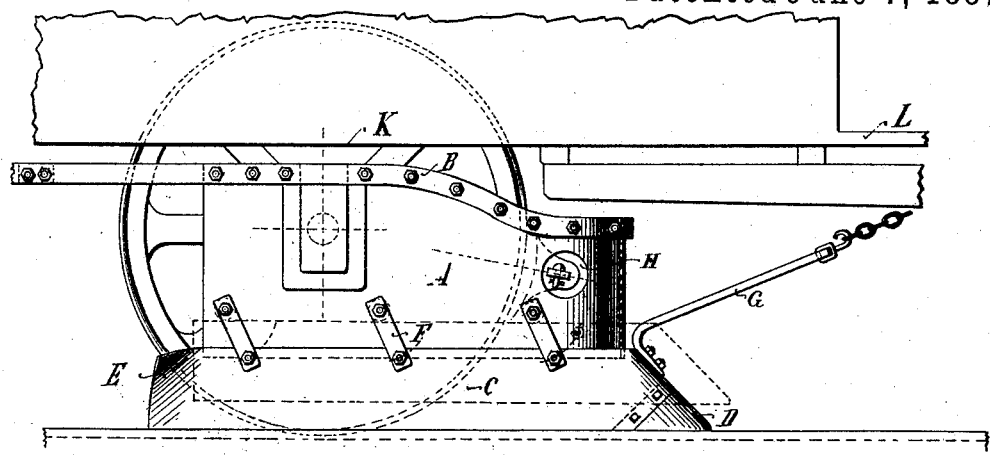
Figure 2:
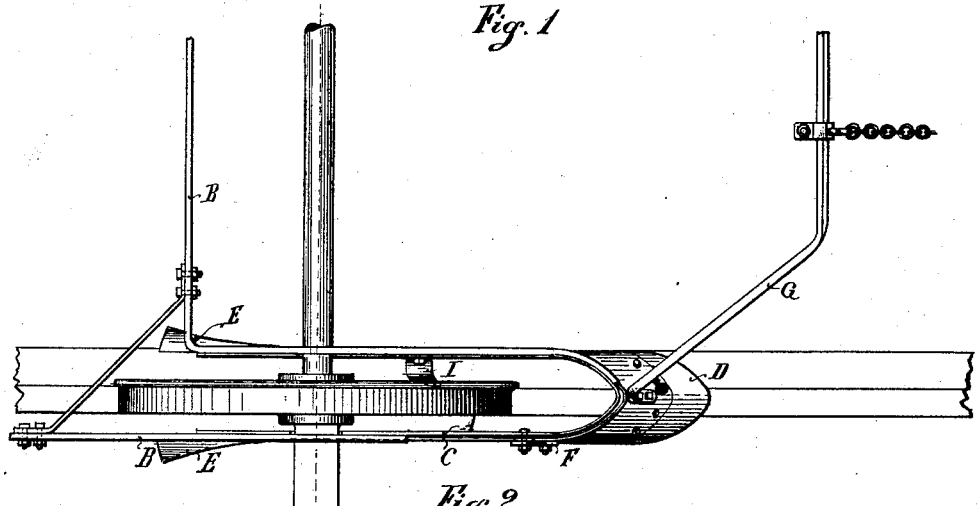
Figure 3:
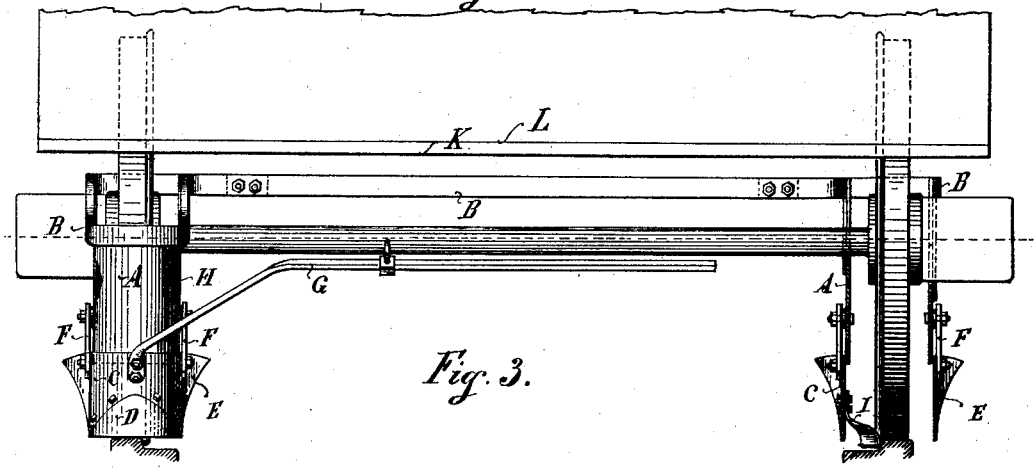

Figure 1 is a side view of my invention attached to a car in operative position. Fig. 2 is a top view of my invention attached to a car in operative position. Fig. 3 is a front view of my invention attached to a car in operative position.

In the drawings similar notations refer to the same parts, and reference being had thereto the letter A designates the upper and stationary wheel-case, one substantial metal plate so bent and shaped as to incase the wheel, substantially as seen in the drawings. This case is fastened by means of bolts or other proper detachable fastenings to the bar B, which is fastened to the journal-boxes of the car by encompassing them or by any suitable detachable fastenings, substantially as seen in the drawings. For the purpose of affording space for the axle and axle or journal box of the car the plates are cut to fit around them; and for the purpose of affording room for the working of the ordinary car-brake and brake-shoe the case A is cut at H to fit around and give play to the brake, room being given inside the stationary case A for the ordinary play of the brake-shoe.

The letter C designates the lower and adjustable wheel-case. This consists of one substantial metal plate so bent and shaped as to incase the wheel, substantially as seen in the drawings; and in cross-section is the same configuration as the upper case, but is made larger, so as to fit over the upper case. It is fastened to the upper case by means of the hinge-joints F and bolts or other proper detachable means that will permit the hinge motion. To the front of this lower wheel-case is fixed a bar, G, that goes across to the front of the lower wheel-case on the opposite wheel, where it is also fixed; and to this bar is fixed a chain, which, being wound up with a crank on a roller, as the ordinary brake-chain is wound up, will raise this lower wheel-case from the track to the position indicated at 1 by the dotted lines, operated from the platform.

The letter D designates the plow-point or scraper, being made of cast-iron or other suitable substance, formed with a shank to set in the ends of the lower wheel-case in front, and is secured therein by bolts or other means. This plow-point is so shaped as to enter under any substance in front of the wheel and cast it aside while down on the rail in working position. It is made easily detachable and replaceable, as it must stand most of the wear and tear.

The letter I designates the flange-scraper to clear the flange of the rail in front of the flange of the car-wheel free from ice or snow or other obstruction. The flange-scraper consists of a bar or strip of metal fastened to the lower wheel-case by means of bolts or other easily-detachable means, and is placed back as far as is consistent with the raising of the lower case, to scrape the flange of the rail immediately in front of the flange of the wheel. The object in placing it far back, almost under the wheel, is that in turning curves it remains against the inside of the rail, and does not jump over the rail and project outside of the curve. In other words, it continues in the position indicated in the drawings, to clear the path of the flange of the wheel even while going around curves; and in that it is an improvement over flange-scrapers heretofore known and used. The rear end of the lower case, at E, is bent in such a shape as to make a groove through the snow with sides sloping inward like the ordinary water-channel, so that after the wheel has passed, the snow or other substance will not so easily fall back onto the rail.

The wheel-case C may be connected with the bar B by means of the hinge-joints F, lengthened out to reach it, thus doing away with the stationary wheel-case A.

Each wheel of the car may have the whole of the foregoing devices, and if the car is run with both ends forward there should be duplicates of the above at each end operated from each platform by means of a crank, or any suitable means; and there may be a double set, each extending to the center line of axle, the front sets being raised with the same chain from the front platform and the hind set from the hind platform—i. e., the cases on front and rear wheels pointing the same way being raised by means of the same chain. Thus by using four sets the whole wheel may be incased both from the front and rear.

I do not claim as new, except in combination with my invention, the mechanism described for raising and lowering the lower wheel-case, and it is obvious that any means adapted to effect that purpose may be used instead of the chain and crank above described.

The object and design of the wheel-cases are to provide means for protecting the car-wheel from becoming clogged by the snow or other obstructions that may have been thrown from the rail by the plow-point or scraper I, and also to throw the snow from their fronts when deep and to lessen the danger to any living object falling in front of the wheels by throwing it off the rail.

The mechanism above described is not intended to throw the obstructions far enough away to keep them permanently from the rail, but rather to clear the path for the wheels and keep them down to and rolling on the smooth surface of the rail.

K is the lower line of the box or body of the car, and L is the upper line of the platform of the car.

At E is seen the curving of the rear end of the lower case.

F designates the hinge-joints, by means of which the adjustment of the lower case is made in connection with the bar G, and the chain and crank attached thereto operated from the platforms.

I do not limit myself to the particular construction of the casing and plow-point, nor to the particular forms, construction, and attachment of the parts herein described and illustrated, as it is obvious that these may be infinitely varied and still perform the functions indicated. My invention covers all equivalent forms, constructions, and attachments in the combinations hereinafter claimed.

What I claim, and desire to secure by Letters Patent, is—

1. The combination of the fixed wheel-case A, the wheel-case C, and the hinge-joints F, detachably and adjustably connected together, substantially as described.

2. The combination of the fixed wheel-case A, the wheel-case C, the hinge-joints F, and the flange-scraper I, detachably and adjustably connected together, substantially as described.

3. The combination of the fixed wheel-case A, the wheel-case C, the hinge-joints F, the flange-scraper I, and the plow-point D, detachably and adjustably connected together, substantially as described.

4. The combination of the fixed wheel-case A, the wheel-case C, the hinge-joints F, and the plow-point D, detachably and adjustably connected together, substantially as described.

5. The combination of the plow-point D, the wheel-case C, the wheel-case A, and the bar B, fastened to the journal-box of the car detachably and adjustably connected together and to the journal-box of the car, substantially as described.

6. The combination of the plow-point D, the wheel-case C, the wheel-case A, the bar B, and the journal-box of the car detachably and adjustably connected together, substantially as described.

7. The combination of the plow-point D, the wheel-case C, the hinge-joints F, the bar B, and the journal-box of the car detachably and adjustably connected together, substantially as described.

8. The combination of the plow-point D, the flange-scraper I, the wheel-case C, having flexible connections with the bar B, and the journal-box of the car detachably and adjustably connected together, substantially as described.

9. The combination of the plow-point D, the wheel-case C, the bar G, with the chain and crank, the wheel-case A, the bar B, the journal-box of the car, and the flange-scraper I in the position indicated, detachably and adjustably connected together, substantially as described.

10. The combination of the plow-point D, the wheel-case C, the bar G, with the chain and crank, the wheel-case A, the bar B, the journal-box of the car, the flange-scraper I, and the car, detachably and adjustably connected together, substantially as described.

11. In a rail-scraper and snow-plow, the combination of an upper stationary case that is shaped in such a way as to surround the wheel, except at the rear, and covering the upper portion of the wheel, adjustably and detachably attached to the journal-box of the car, and a lower movable case that is shaped in like manner, fitting outside the upper stationary case, and adjustably and detachably attached thereto with hinge-joints in such manner that the lower case may be raised and lowered by a motion that causes any point in the lower case to describe an arc of a circle, substantially as described.

12. In a rail-scraper and snow-plow, the combination of an upper stationary case that surrounds the wheel, except at the rear, and covering the wheel from near the lower car-line down to within a few inches of the rail, adjustably and detachably attached to the journal-box of the car, together with a lower movable case that likewise surrounds the wheel, covering the wheel from the rail up to a few inches above the bottom of the upper stationary case, outside the latter, and adjustably and detachably attached thereto with hinge-joints, together with a plow-point adjustably and detachably attached in front and a flange-scraper adjustably and detachably attached to the side of the lower case in such position that it will clear the path of the flange of the wheel, moving a short distance in front thereof and back far enough to keep in the path of the flange of the wheel when going around curves in the track, substantially as described.

13. The combination of the journal-box of the car, detachably attached to any wheel-casing, consisting of an upper stationary case and a lower adjustable case in front and to the sides of the wheel, adjustably and detachably connected together with flexible connections, clearing the space through which the wheel is to pass in such manner that the lower adjustable case may be raised from and lowered to the track with a motion that causes any point in the lower case to describe the arc of a circle.

14. In a rail-scraper and snow-plow, the combination of a car journal-box, an upper stationary case, a lower adjustable case attached to the upper case in such manner as to be easily raised from the rail and lowered down thereto, a plow-point adjustably and detachably fastened thereto, and a flange scraper fastened to the side of the lower case in the position indicated.

15. The combination of the journal-boxes of the car flexibly and detachably attached to any wheel-casing in front and to the sides of wheels, covering the space to be passed through by the wheels in such manner that the casing may be raised from and lowered to the rails.

16. In combination, the journal-boxes of the car attached to any wheel-casing in front and to the sides of the wheels, consisting of upper stationary cases, to which are flexibly, adjustably, and detachably attached lower adjustable cases, covering the space to be passed through by the wheels in such manner that the lower cases may be raised from and lowered to the rails, the stationary cases detachably attached to a brace-rod reaching from side to side of car to hold the casing in position in such manner as to obviate the necessity of attaching the casing to the axle on the side opposite to the journal-boxes.

17. In a rail-scraper and snow-plow, the combination of a car journal-box, an upper stationary case, a lower adjustable case attached to the upper case in such manner as to be easily raised and lowered from and to the rail, a plow-point detachably attached thereto, and a flange-scraper fastened to the side of the lower case in the position indicated.

18. In a rail-scraper and snow-plow, the combination of an upper stationary case that surrounds the wheel, except at the rear, and covering the wheel from near the lower car-line down to within a few inches of the rail, detachably attached to the journal-box of the car, with a lower movable case that likewise surrounds the wheel, covering the wheel from the rail up to a few inches above the bottom of the upper stationary case, outside the latter, and adjustably and detachably attached thereto with hinge-joints to a plow-point adjustably and detachably attached in front and a flange-scraper adjustably and detachably attached to the side of the lower case in such position that it will clear the path of the flange of the wheel, moving a short distance in front thereof and back far enough to keep in the path of the flange of the wheel when going around curves in the track, substantially as described.

ELISHA B. DURFEE.

Witnesses:
 PAUL P. JOHNSON,
 EDWARD O'MALLEY.